June 15, 1937.  W. A. BARRETT  2,083,812
FILTERING MACHINE
Filed Oct. 17, 1934  2 Sheets-Sheet 1

INVENTOR
W. A. Barrett
BY
Elwin M. Huber
ATTORNEY

June 15, 1937.　　　W. A. BARRETT　　　2,083,812
FILTERING MACHINE
Filed Oct. 17, 1934　　　2 Sheets-Sheet 2

INVENTOR
W. A. Barrett
BY
ATTORNEY

Patented June 15, 1937

2,083,812

UNITED STATES PATENT OFFICE 2,083,812

FILTERING MACHINE

Walter A. Barrett, Fort Wayne, Ind.

Application October 17, 1934, Serial No. 748,631

2 Claims. (Cl. 210—201)

The invention relates to machines for filtering various products especially sour cream in preparing it for butter manufacture.

A screen cloth that will separate foreign matter usually found in cream necessarily should have a very fine mesh. Sour cream is generally thick and contains globules of butter fats and other matter which cake on the cloth and clog it so that screening of the cream is slow and requires frequent cleansing of the cloth.

The object of my invention is to provide a mechanism by which the foregoing disadvantages are overcome and in which the screen cloth is maintained in a clean condition permitting rapid and thorough treatment of the material.

The invention consists of the novel combination and arrangement of parts hereinafter described and set forth in the claims and illustrated in the accompanying drawings in which Figure 1 is a side elevational view of a machine embodying the invention, the screen being broken away.

Figure 1:
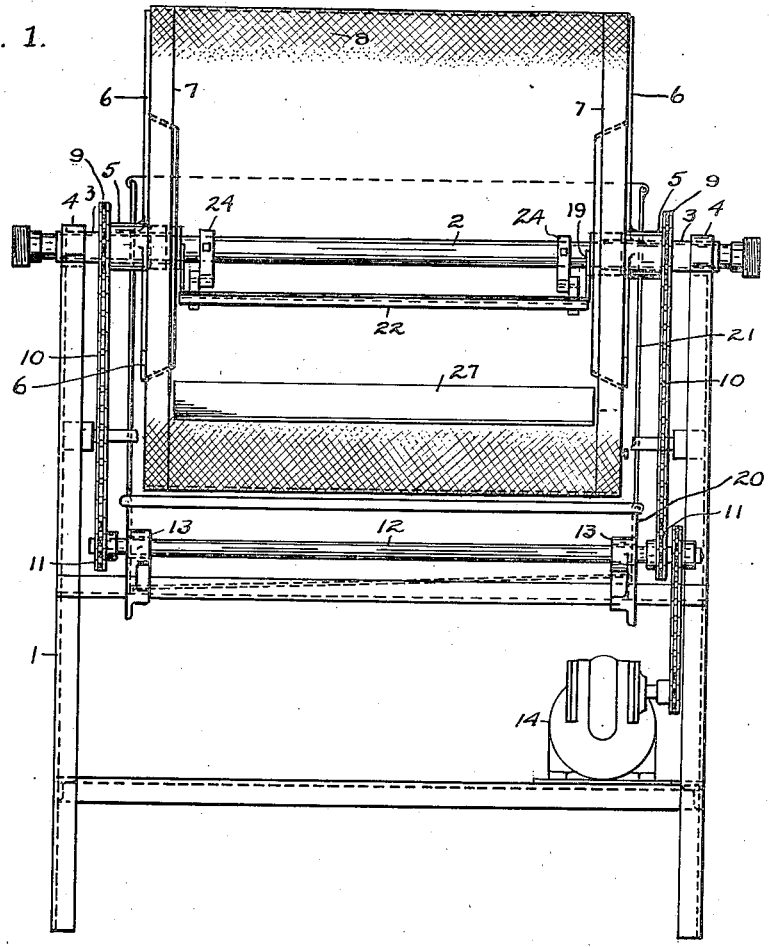
Figure 4:
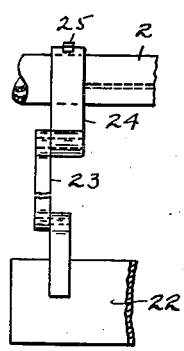
Fig. 4 is a fractional plan view of the inner scraper or squeegee.
Figure 5:
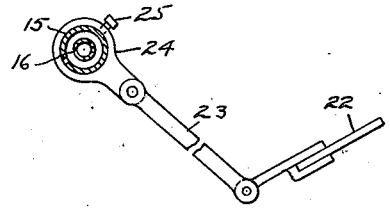
Fig. 5 is a side view of the scraper or squeegee.
Figure 2:
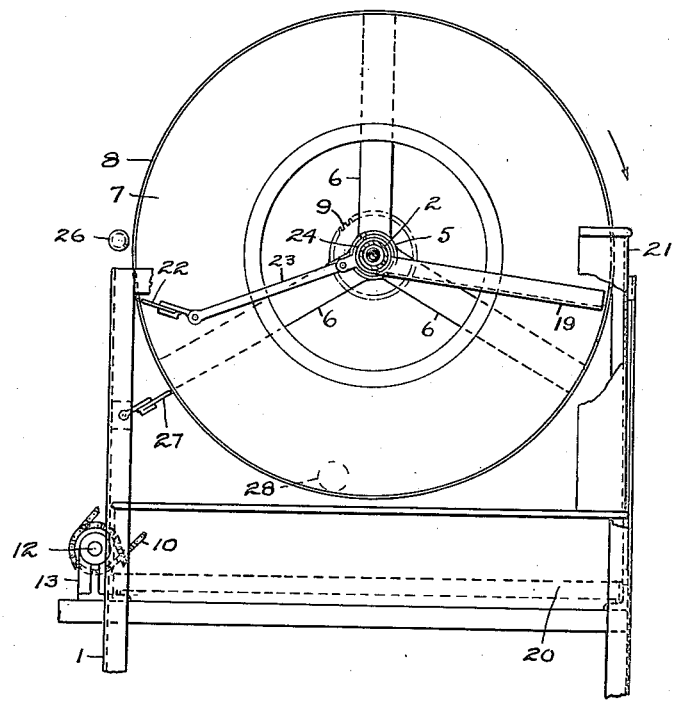
Fig. 2 is an end view of the same partly broken away.

Referring to the illustrative embodiment of the invention 1 represents a suitable frame formed preferably of angle bars. A hollow shaft 2 is rigidly mounted on the frame by the sleeves 3 and cleats 4. The hubs 5 are revolubly mounted on the sleeves 3 and the spokes 6 connect the hubs to the rings 7 upon the outer periphery of which is secured the screen cloth 8. This cloth is preferably formed of metal having a mesh of suitable fineness and which with its supporting members forms a revoluble drum.

A sprocket wheel 9 is fixed on each hub 5 and is caused to rotate by a chain 10 which engages a sprocket wheel 11 fixed on a shaft 12 revolubly mounted in the bearings 13. An electric motor 14 drives the shaft 12 to cause rotation of the drum in the direction of the arrow.

Figure 3:
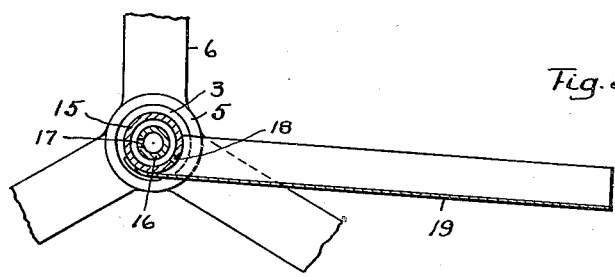
Fig. 3 is a cross-section of the shaft and feed distributor.

I prefer to form the shaft of two tubes 15, 16, one within another. The inner tube 16, Fig. 3, is provided with openings or slots 17 and similar slots or openings 18 are formed in the outer tube 15 out of line with the openings or slots in the tube 16. The liquid to be treated enters the inner tube and discharges into the outer tube from which the liquid discharges evenly onto a distributor 19. The upright sides of the distributor are secured to the inner ends of the sleeves 3 and the bottom is carried around and secured to the shaft element 15. Either end of the tube 16 may be connected to the supply of liquid to be treated, the other end being closed at such time. The lower or discharge edge of the distributor is relatively close to the downwardly moving side of the screen cloth of the drum and preferably below the horizontal axial plane of the drum. The material passes over the edge of the distributing pan onto the screen cloth, the material that passes through the cloth being received by the tank 20 that is supported on the frame beneath the drum. A guard 21 at the side of the drum directs into the tank any material that passes through the screen cloth any considerable distance above the tank.

In order to clean the screen cloth and prevent its clogging with the materials that do not pass through it I support a squeegee or scraper 22 that is adjustably mounted on the arms 23 which arms are pivoted to the collars 24 fixed on the shaft member 15 by the set screws 25. The scraper is preferably formed of rubber and is adjusted on its supports to contact with the screen cloth preferably on the opposite side of the drum relatively to the distributor.

At a suitable point relatively to the scraper 22 I may install a steam pipe 26 from which steam is discharged onto the exterior of the screen cloth above the scraper. The steam tends to dislodge any materials that are not removed from the screen cloth by the scraper.

For some uses I install a scraper or squeegee 27 on the frame and adjust it to contact with the exterior surface of the screen, preferably below the axis thereof. The outer scraper tends to remove a thin film of cream that may remain on the outer surface of the screen whereby to make cleaning of the screen easier. In some cases the use of steam may be omitted, the two scrapers being sufficient to maintain the screen in a clean or unchoked condition. The quality or condition of the cream to be treated determines whether both scrapers shall be used or the steam jet omitted.

In operation, the material (the curd) within the screen drum clings to the rising side of the screen and is more or less held back by the squeegee 22. The layer of the curd material on said side increases in thickness as the rotation of the drum continues, until finally its upper portion turns over and forms into a roll 28 which extends the entire length of the drum and rotates on the inner surface of the screen. This roll tends to maintain the interstices of the screen in a clean condition. The squeegee 22 wipes off the inner surface of the screen above the roll of curd and if necessary the steam jet may be used to remove any material that remains in the interstices of the screen. With some materials the roll will form without the assistance of the scraper 22. The roll of curd is most effective in cleaning the screen.

The treated material is thoroughly cleansed by the machine, and in the case of sour cream the amount of butter fat retained in the screen drum with the foreign matter is very small.

What I claim is:

1. A filter comprising a cylindrical screen, a fixed hollow shaft revolubly supporting the screen and adapted to discharge the material to be treated into the interior of the screen, a pan mounted on the shaft to distribute said material on to the inner peripheral surface of the screen and an adjustable scraper contacting the said inner surface of the screen below the horizontal plane of the axis of the cylindrical screen.

2. A filter comprising a fixed hollow shaft, a cylindrical drum revolubly mounted on the shaft and having its peripheral wall formed of screening material, the shaft being adapted to feed the material to be treated into the drum, a pan secured to the shaft and extending downwardly and outwardly toward the screening material and adapted to distribute the feed on said screening material, an adjustable scraper mounted on the shaft and engaging the inner surface of the screening material below the horizontal plane of the axis of the screen, a scraper engaging the outer surface of the said material and means to project fluid under pressure against said outer surface.

WALTER A. BARRETT.